US011445778B2

(12) United States Patent
Castro Ramos

(10) Patent No.: US 11,445,778 B2
(45) Date of Patent: Sep. 20, 2022

(54) ECOLOGICAL FOOTWEAR ELABORATED FROM RECYCLED PLASTIC FIBERS AND RECYCLED OR DISPOSAL ORGANIC MATERIAL, PRODUCT AND PROCESS

(71) Applicant: Jorge Emmanuel Castro Ramos, Guanajuato (MX)

(72) Inventor: Jorge Emmanuel Castro Ramos, Guanajuato (MX)

(*) Notice: Subject to any disclaimer, the term of this patent is extended or adjusted under 35 U.S.C. 154(b) by 204 days.

(21) Appl. No.: 16/827,915

(22) Filed: Mar. 24, 2020

(65) Prior Publication Data
US 2020/0305540 A1   Oct. 1, 2020

(30) Foreign Application Priority Data
Mar. 25, 2019   (MX) .................... MX/a/2019/003392

(51) Int. Cl.
| A43B 1/02 | (2022.01) |
| A43B 1/12 | (2006.01) |
| A43B 1/14 | (2006.01) |
| A43B 1/00 | (2006.01) |
| A43B 1/06 | (2006.01) |

(52) U.S. Cl.
CPC .............. *A43B 1/02* (2013.01); *A43B 1/0018* (2013.01); *A43B 1/06* (2013.01); *A43B 1/12* (2013.01); *A43B 1/14* (2013.01)

(58) Field of Classification Search
CPC .. A43B 1/02; A43B 1/016; A43B 1/12; A43B 1/14; A43B 1/0018
USPC .......................................................... 36/84
See application file for complete search history.

(56) References Cited

U.S. PATENT DOCUMENTS

| 4,018,646 A | 4/1977 | Poyser |
| 5,346,934 A | 9/1994 | Chriss |
| 2016/0302508 A1* | 10/2016 | Kormann ............. B29D 35/067 |
| 2018/0327564 A1* | 11/2018 | Baghdadi ............. A43B 17/003 |

FOREIGN PATENT DOCUMENTS

| CN | 102677190 | 9/2012 |
| CN | 202843090 | 4/2013 |
| CN | 103305960 | 9/2013 |
| KR | 101033212 | 5/2011 |
| KR | 101361242 | 2/2014 |
| WO | WO2010125545 | 11/2010 |
| WO | WO2014209752 | 12/2014 |

* cited by examiner

*Primary Examiner* — Timothy K Trieu
(74) *Attorney, Agent, or Firm* — Defillo & Associates, Inc.; Evelyn A. Defillo

(57) ABSTRACT

Process for obtaining ecological footwear using recycled or waste organic materials for the production thereof, particularly materials such as sargassum, coffee waste, and agave bagasse and using solvent-free water-based adhesives, therefore friendly to atmosphere. The process includes assembling the footwear with woven fabrics and non-woven polyester fabrics obtained from fibers that are produced with bottle flakes and postindustrial recycled material of the same polymer, in addition to including the thread and laces made with filaments obtained from the same recycled nature, and incorporating the sole and details with a percentage of recycled polyester plastic bottles, sargassum, coffee waste, and pulverized agave gabazo used as an inert load, so the footwear presented has a recycled polyester content, Sargassum, coffee residues and agave gabazo between 5 and 90% in weigh.

13 Claims, 1 Drawing Sheet

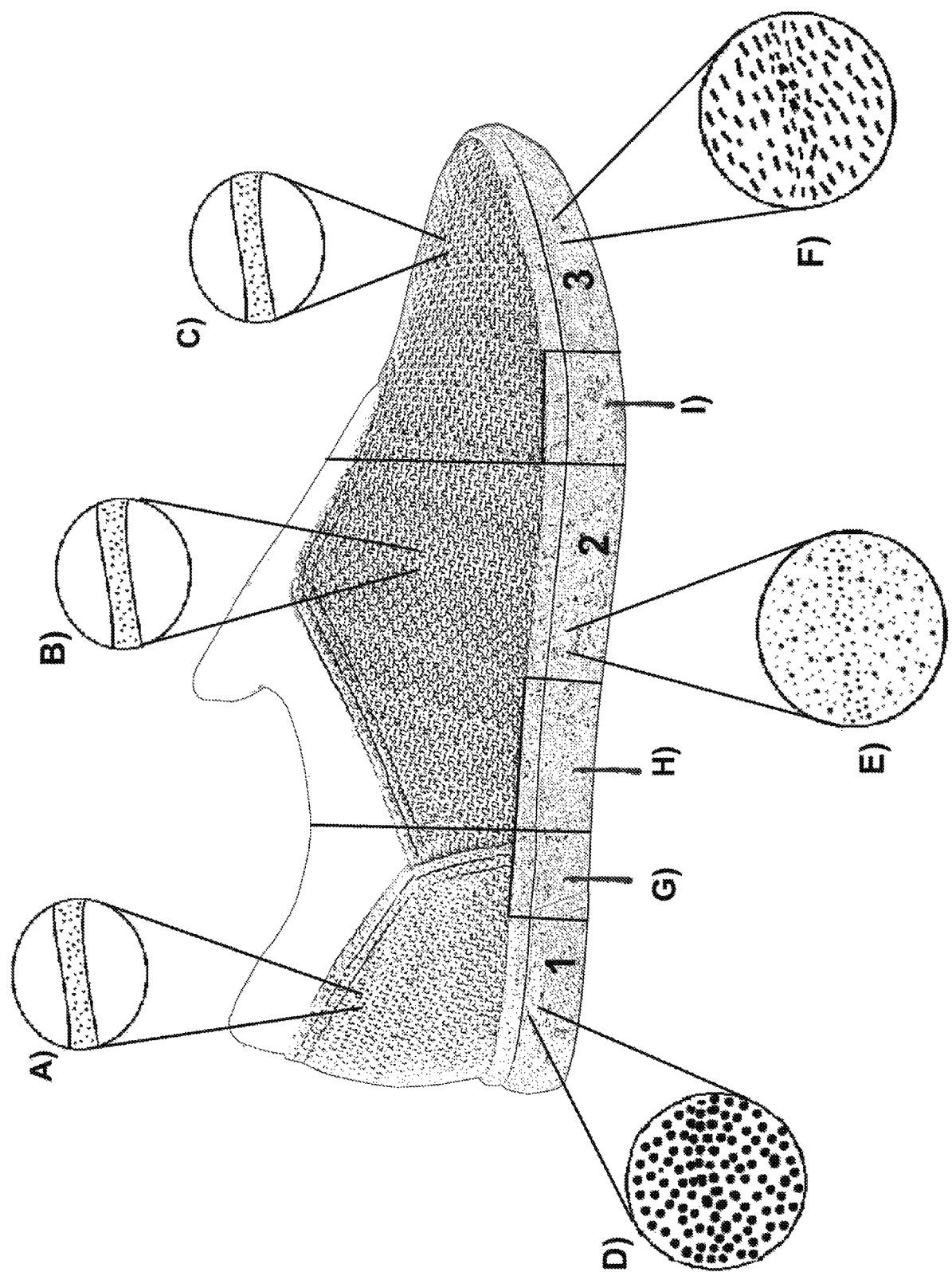

ECOLOGICAL FOOTWEAR ELABORATED FROM RECYCLED PLASTIC FIBERS AND RECYCLED OR DISPOSAL ORGANIC MATERIAL, PRODUCT AND PROCESS

FIELD OF THE INVENTION

The present invention relates to the process for the production of footwear, particularly to the processes necessary for the treatment of the parts and materials constituting the footwear, specifically those materials derived from recycled organic materials or post-consumer and/or industrial waste.

BACKGROUND OF THE INVENTION

The present invention relates to a process for the manufacture of ecological footwear, using recycled organic materials or post-consumer and/or industrial waste. For the production of the same, particularly materials such as sargassum (sargassum), coffee waste and agave gabazo, also using solvent-free water-based adhesives, therefore friendly to the environment, this is achieved with the assembly of footwear with woven fabrics and non-woven polyester fabrics obtained from fibers produced with flakes of recycled plastic bottles and postindustrial material of said polymer, integrating powdered particles of said organic material or waste such as sargassum into polyester fibers (sargassum), coffee waste and agave bagasse, in addition to including the thread and laces of the same recycled nature, as well as the sole and details with a percentage of polyester recycled polyester plastic bottles, Sargasso (sargassum), coffee and gabazo waste of powdered agave used as an inert load.

Regarding the reinstatement of polyester to products such as fibers, different inventions have been developed, document CN103305960A clearly describes the manufacturing process of discontinuous fibers and filaments from polyester in bottles and industrial post, another example of polyester recycling is described in the document CN102677190A showing a process for obtaining staple fibers from bottle flakes.

Already with the fibers and filaments made of recycled polyester, they are processed to obtain nonwoven fabrics which can be obtained by punching, according to U.S. Pat. No. 4,018,646 which deals with the formation of this class of fabrics, as well as the patent WO2010125545A2 which also describes the process of Obtaining a non-woven fabric from polyester postindustrial materials. Processes have also been documented, such as the CN202843090U patent, which describes the obtaining of woven fabrics with regenerated polyester from bottles and industrial post. On the other hand, some documents, such as U.S. Pat. No. 5,346,934A, describe a process to obtain footwear with recycled materials from leather, wood and cotton.

Unlike these inventions, the present invention presents ways of using the materials obtained from recycled polyester plastic bottles and organic waste such as sargassum, coffee waste and agave bagasse, such as woven fabrics and non-woven fabrics. means of the pulverization of this polymer and organic waste material used and integrating to the fibers of the polyester powdered particles of said organic matter or waste such as sargassum, coffee waste and agave bagasse, and said organic waste is incorporated as an inert load for the injection of soles, to achieve functionality with the best use of recycled products which offers properties of lightness, breathability, and comfort particularly. In addition, the present invention considers the mixing of recycled materials with solvent-free water-based adhesives that do not contaminate with volatile materials, of more than not harmful to contact with humans.

Regarding the use of recycled or waste organic material such as sargassum, there are a considerable number of patent applications that deal with sargassum processes and methods such as applications KR1018241650000, CN103907909, CN104187216, CN104171833, among others, they are particularly for generating products for human consumption (food and beverages), whereby said processes have a considerable difference from that of the present invention.

Regarding coffee waste, there are inventions that deal with the methods for manufacturing pellets from them. Applications KR101033212, KR101361242, KR1020180060192 and (KR1015550120000 speak of methods of producing pellet fuel from coffee waste to improve the resource recycling property and obtain an environmentally friendly fuel: supply coffee waste powder; inserting coffee waste powder in an acid solution; remove acidified protein solids from the mixture; washing of coffee powder without protein powder; drying of the washed coffee waste powder; mixing dry coffee powder with sawdust and quicklime, to obtain powder composed of pellets, and producing a pellet with the powder of the pellet compound. However, unlike our invention, the present considers ways of using the materials obtained from bottles recycled polyester plastic sprayed with this polymer and organic waste such as sargassum, coffee waste and agave bagasse, to integrate powdered particles of waste organic matter into polyester fibers, which considers a different process.

Similarly, the invention KR1020170067222 relates to a method for producing plastic products containing coffee waste, comprising the following steps: melting a polymeric resin; dry the coffee waste to a residual humidity of 1% or less and crush the coffee waste; store the ground coffee grounds in an empty state; introducing coffee waste stored in the vacuum state in the molten polymer resin; mix the coffee waste introduced with the molten polymeric resin; extrude the polymer resin to produce a pellet; and produce the plastic products by injection molding of the granule, in which the stages of introduction and mixing of the coffee waste are carried out in an extruder. However, our invention. In contrast, our invention is not only used for the production of pellets by extrusion, but also said organic waste is added and incorporated as an inert load for injection by means of an extruder and molded soles under pressure, it will also be used for the manufacture of woven and non-woven polyester textiles obtained from fibers produced with flakes of recycled plastic bottles and postindustrial material of said polymer, integrating powdered particles of organic waste such as sargassum into polyester fibers (sargassum), coffee waste and agave bagasse, in addition to including the thread and laces of the same recycled nature.

As for agave bagasse, inventions were found regarding a process for the production of ethanol (WO2014209752, WO2014209752) which represents different conditions when seeking its use as a combustible product. On the other hand, the invention MXJL/a/2005/00005 seeks the production of fiber for human consumption, which as mentioned above, requires a process with conditions very different from those of the present invention.

In general terms, regarding the process, there is the application number MX/A2014/006652 that deals with the elaboration of an ecological footwear that comes from the waste of the pet, post-consumption and/or post-industrial plastic bottles and with this polymer of waste to create woven and non-woven fabrics from this PET polyester polymer and with that make a cut as known in the shoe industry and then glue it with water-based adhesives free of solvents friendly to the environment through processes, times, movements, temperatures and common machinery in the industry. The present invention demonstrates an improvement of the above process by incorporating these recycled fibers of polyester, organic matter as pulverized inert filler and sargassum (sargassum), coffee waste and agave gabazo to use the waste from the transformation of other products. In addition, the process of the present invention improves the polymers to create organic plastic soles, 1 sargassum 2 coffee 3 agave is added to the pellet to achieve 3 types of organic polymer different commercial sole products.

It is manufactured and improved as an inert load, not only the spraying of discarded plastic bottles is added but percentages of between 5 and 90% of organic material such as sargassum (sargassum) coffee waste and agave gabazo are added.

OBJECT OF THE INVENTION

Procedure for the production of ecological footwear using recycled or waste organic materials for the production thereof, particularly materials such as sargassum, coffee waste and agave gabazo, in addition to polyester spraying, to create organic polyester fibers and manufacture woven and nonwoven fabrics. Organic matter Sargasso (sargassum), coffee waste and agave gabazo as an inert load in the injection of soles and glued with water-based adhesives free of environmentally friendly solvents, resulting in an ecological footwear with multiple properties.

DETAILED DESCRIPTION OF THE INVENTION

The present invention refers to a method of producing plastic soles, this resides in the process in which organic materials (sargassum), coffee waste, and agave gabazo) are used in immediate drying ovens leaving a range of humidity between 5 and 15% this is not to lose the qualitative properties such as smell, color and texture. And understand these steps. Mix a polymer resin, use a drying oven with linear movement at a temperature of 30 and 40 degrees Celsius with a band movement of between 15 seconds and 20, to handle the residue of coffee, sargassum and agave gabazo and achieve the humidity of between 5 and 15%, we mix the polymer resin separately to achieve 3 types of ecological polymer, from 5% to 90% of organic matter is added to the polymer creating 3 types of polymer, 1. with coffee residue, 2.sargaso (sargassum) and 3. agave gabazo. That each waste is fused into a single resin and as a result we achieve an organic polymer that in turn is biodegradable because the organic matter decomposes the polymer in time and natural environment that lasts from 10 to 20 years of useful life so that Said organic polymer rejoins the planet without leaving toxic residues and becomes food for microorganisms. Not only can said polymer be produced and manufactured to produce pellets, and produce plastic soles in the different types of polymers existing for everyday and commercial use of the sole of a shoe such as PVC polyvinyl chloride resin, TR thermoplastic rubber, SBC stireno butadiene, thermoplastic polyurethane TPU, Eva Injected ethyl vinyl acetate and Molded PU polyurethane soles Rubber or rubber soles and Eva expanded ethyl vini acetate, but also to achieve functionality with the best use of recycled products which offers lightness, breathability properties, and comfort particularly. It is used for the production of pellets by extrusion, and in another new process such organic waste is incorporated as an inert load and for injection by means of an extruder and molding of soles under pressure, it will also be used for the manufacture of woven textiles and not Polyester fabrics obtained from fibers that are produced with flakes of recycled plastic bottles and postindustrial material of said polymer, integrating powdered particles of organic waste such as sargassum (sargassum), waste into the polyester fibers.

The characteristic details of this novel procedure for the elaboration of ecological footwear using materials obtained from post-consumer recycled polyester (bottles) and industrial post and glued with environmentally friendly adhesives are clearly shown in the following description and in the accompanying drawings.

The materials used in the process of making ecological footwear are based on a mixture of recycled polyester and raw materials for conventional consumption. The procedure for the elaboration of ecological footwear using materials obtained from post-consumer recycled polyester (bottles) and industrial post and glued with environmentally friendly adhesives according to the present invention includes:

a) Cut a non-woven fabric or woven fabric into different pieces of cut, lining and tongue, in addition to the ornament template, as well as the antibacterial comfort template and the details of the cut, by any of the known cutting processes: a hand with blade, with a hydraulic press using soft with defined designs, with laser machine or computerized machine with knives.

b) The non-woven fabric or woven fabric that is part of the cut is detailed with embroidery, as it is part of the view, using colored polyester thread.

c) The pieces of non-woven fabrics and woven cutting and lining fabrics are joined with water-based adhesive, followed by a stitching process that consists of joining the cut and lining with a surface seam creating a subtle line of decoration.

d) The tongue is joined with the cutting and lining stitching process.

e) Once the cut is ready, it is assembled using any of the different conventional processes: 1) the template, which consists of joining the nonwoven or woven fabric template to the cut by means of stitching without joining the back, 2) strobel, where the cut and the saucer plant is joined in all the inferior edge and 3) enjaretado, process with which a seam is added in the inferior edge of the cut and inserting a thread used as jareta for the subjection of the cut to the last, 4) Traditional mounted, by means of thermoforming the tip, clasps and heel, 5) Mounted type glove where the blade, lower part of the cut, joins the upper part of the cut known as floreta, cooked with 1.0 or 1.2 mm thread, and Finally, 6) the Driver process, which consists of splicing the sole with the cut fixed with sight stitching, and incorporating the float with fabric to the shovel.

f) With the cut ready, it is mounted to the last with the help of a vaporizer, holding it firmly.

g) A process that incorporates the sole to the cut is the pressing which consists in that once the sole is already formed, it joins the cut with a water-based adhesive using a pre-drying of the latter and applying pressure with a hydraulic press to the union between cut and sole.

h) Another process used for the incorporation of the sole to the cut is by means of the polymer injection process, which after the assembling process the last is placed with the cut in a mold to which a thermoplastic polymer is injected directly into the cut Then it cools and unmolds. The thermoplastic polymer is additive or not with inert loads to improve the properties and saving of the polymer, these charges only provide volume without reaction or reach their melting point to avoid mixing of polymers, for that reason inert or use loads are used melting point greater than injection thermoplastic.

i) The assembly process and the sole incorporation process are combined according to the needs of the footwear, giving extra properties to each type of combination, that is, we have ecological footwear formed with embossed and direct injection to the cut, in addition to strobel and direct injection to the cut and enjaretado and direct injection to the cut, thus also implanted with glued of preformed sole, strobel with glued of sole and enjaretado with glued of preformed sole.

j) Finally, it is dismantled, and the laces are incorporated.

As the term nonwoven fabric is used, it generally includes, but is not limited to nonwoven fabric made of polyester fibers obtained from post-industrial recycled bottle flakes, as well as virgin polyester and combinations thereof. The non-woven fabric has the characteristic of having a weight between 40 to 500 g/m² depending on the final footwear.

The non-woven fabric can be replaced by woven fabric made of polyester filaments obtained from bottle flakes or recycled from industrial post or virgin polyester or their possible mixtures, these fabrics can have a weight between 40 and 400 g/m².

It should be mentioned that non-woven fabrics and woven fabrics are used both for cutting (external part of footwear) and for lining (internal part of footwear) as they are porous and provide good permeability to footwear and keep the foot cool.

The term antibacterial template includes foamed ethylene vinyl acetate (EVA) templates, natural latex with antibacterial additives such as trichloride, silver or pyridine.

In this invention the term water-based adhesive includes, but is not limited to polyurethane, vinyl, acrylic based adhesives and combinations thereof. The threads used in the process described in this invention include but are not limited to recycled polyester from bottle and industrial flakes, virgin polyester, polyamide (nylon), cotton and mixtures thereof.

As used the term sole generally includes, but is not limited to soles made of thermoplastic rubber (TR), polyvinyl chloride (PVC), thermoplastic polyurethane (TPU), polyurethane, expanded polyvinyl chloride, rubber, ethylene vinyl acetate (EVA), polystyrene, acrylonitrile-butadiene-styrene (ABS) and their combinations. In this invention the term thermoplastic polymer for direct injection to the cut includes, but is not limited to the thermoplastic polymers of polyvinyl chloride (PVC), thermoplastic polyurethane (TPU), polyurethane, expanded polyvinyl chloride, rubber, ethylene vinyl acetate (EVA), polystyrene, acrylonitrile-butadiene-styrene (ABS), thermoplastic rubber (TR) and combinations thereof.

As the term "inert fillers" is used, it generally includes, but is not limited to pulverized polyester, calcium carbonate, talcum powder, wood dust and silicates. The term lattice used in this patent includes but is not limited to laces made of recycled polyester filaments from bottle and industrial post flakes, virgin polyester, cotton, acrylics, polypropylene and mixtures between them.

Referring to FIG. 1, a cross-section of the ecological footwear obtained according to the present invention is observed, where the components made with recycled polyester of bottle flakes and industrial post in the form of fibers and powdered, where the lining (1) can be seen as an example.) and the cut (2) are nonwoven fabrics made of fibers obtained from bottle flakes and postindustrial recycling, the antibacterial template (3) is shown with high thickness and low density which gives comfort, the nonwoven fabric template (4) it is a non-woven fabric as well as the lining obtained from recycled polyester fibers of bottle and industrial post flakes; Another point in FIG. 1 is the thread (5) in which it gives details to the ecological footwear, the sole (6) is shown with small particles of recycled bottle and post-pulverized industrial post (7), and finally the laces (8) They are manufactured with polyester recycling filaments.

This invention describes the process for the production of ecological footwear and said footwear differs according to the process of the amount of polyester used for its elaboration, that is to say the footwear has from 15% by weight of the polyester, if only the nonwoven fabric obtained is used of bottles in the lining, and up to 85% recycled polyester if used in the other components.

Once the content of the present invention has been described, a manufacturing example will be shown where the novel components are included, but it is not limited to this composition since ecological shoes have been obtained with all possible combinations.

BRIEF DESCRIPTION OF THE FIGURES

FIG. 1. shows a graphic description of the invention of the upper part of the footwear (cut) and Graphic description of the invention lower part of the footwear (sole).

a) Recycled polyester fibers incorporated powdered sargassum.
b) Recycled polyester fibers incorporated coffee waste.
c) Recycled polyester fibers incorporating agave gabazo.
d) Sargassum spray as inert load.
e) Spraying coffee waste as an inert load.
f) Powdered agave gabazo as an inert load.
g) Pelletized and injected with biodegradable organic sargassum polymer (sargasssum).
h) Pelletized and injected with biodegradable organic coffee waste polymer.
i) Pelletized and injected with biodegradable organic polymer agave gabazo.

Having described the invention as above, the following is claimed as property:

1. A process for obtaining an ecological footwear using materials obtained from recycled polyesters flakes, incorporating a pulverized organic waste material including a sargassum, a coffee waste, and a post-consumption agave gabazo (bottles), and post-industrial fibers including an inert load, wherein a sole is made of a discarded organic matter including sargassum, coffee, and/or agave mixed with polymers and glued with environmentally friendly adhesives, the method comprising the steps of:

a) crushing the recycled polyester flakes and incorporating into a machine, then melting the recycled polyesters flakes, adding the pulverized organic waste material (sargassum, scrap waste) and incorporating the coffee waste and the agave gabazo, wherein the organic waste particles get trapped in staple fibers and polyester filaments once extruded from the machine;
   b) after incorporating the staple fibers, transferring the organic waste to a machine so that through a punching process to obtain a nonwoven fabric made with the recycled polyester fibers of sargassum, sargassum particles, coffee waste and gabazo agave;

c) making continuous filaments with the nonwoven fabric, elaborating woven fabrics by using a flat or circular woven machine;
d) cutting the non-woven fabric or the woven fabric into different cutting pieces, lining, and tongue, in addition to an ornament template, as well as the antibacterial comfort template and the details of the cut, by any of the known cutting processes such as a hand with blade, with a hydraulic press using soft with defined designs, with laser machine, or computerized machine with knives;
e) detailing the non-woven fabric or the woven fabric with embroidery by using colored polyester threads;
f) joining the pieces of the non-woven fabrics and the cutting woven fabrics, and lining with water-based adhesive, and stitching cut and lining with a surface seam;
g) joining the tongue with the stitching process to the cut and lining;
h) assembling the cut by any of the different conventional processes including: 1) template, joining the template of non-woven fabric or woven fabric to the cut by stitching without joining the back, 2) strobel, joining the cut and the plant plate throughout the lower edge, 3) enjaretado, adding a seam in the inferior edge of the cut, and inserting a thread used as a jareta for the subjection of the cut, 4) traditional mounted, by thermoformed the tip, clasps and heel, 5) mounted type glove where the shovel, lower part of the cut, joins the upper part of the cut known as floreta, cooked with 1.0 or 1.2 mm thread, and finally 6) the driver process, which includes—splicing the sole with the cut fixed with sight stitching, and incorporating the flowerpot with tissue to the shovel;
i) assembling while using a vaporizer;
j) mixing a resin of different polymers, a drying oven with linear movement at a temperature of 30 and 40 degrees Fahrenheit is used with a band movement of between 15 and 20 seconds, to manipulate the coffee residue, sargassum (sargassum) and agave gabazo, and achieve moisture of between 5 and 15%, mixing the polymer resin separately to achieve 3 types of ecological polymer, from 5% to 90% of organic matter is added to the polymer creating 3 types of polymer, 1) with coffee residue, 2) Sargassum, and 3) agave gabazo, wherein each waste is fused into a single resin and as a result an organic polymer is obtained, which in turn is a biodegradable pellet;
k) incorporating the organic polymer pellet in manufacturing machines for conventional soles through an extruder that in turn fills an aluminum mold having a design of the sole, said pellet is melted, the organic polymer pellets are made of (PVC) polyvinyl chloride resin, (TR), thermoplastic rubber, (SBC) stirene butadiene, (TPU), thermoplastic polyurethane, (Eva) ethyl vinyl acetate, and molded (PU) polyurethane, rubber, or rubber and expanded (Eva) ethyl vinyl acetate;
l) adding the inert load of powdered organic matter fibers and mix when adding the polymer pellets for injection of conventional and commercial soles from 5 to 90% of organic matter;
m) incorporating the sole into the cut, once the sole is formed joining the cut with a water-based adhesive using a pre-drying, and applying pressure with a hydraulic press to the joint between cut and sole;
n) optionally incorporating the sole into the cut by polymer injection, placing with the cut in a mold into which a thermoplastic polymer is injected directly into the cut, then cooled and unmold, the thermoplastic polymer is additive or not with inert loads to improve the properties and saving of the polymer, only provide volume without reaction or reacting the melting point to avoid mixing of polymers, for that reason inert or use loads are used with melting point greater than injection thermoplastic;
o) manufacturing the ecological footwear and optionally incorporating the sole, the ecological footwear is manufactured with direct-cut or strobel injection and direct injection to the cut or lattice and direct injection to the cut or embellished with pre-cut sole formed or strobel with glued sole or lattice with glued preformed sole; and
p) removing the ecological footwear and incorporating laces.

2. The process in accordance with claim 1, wherein the nonwoven fabric is comprised of nonwoven fabrics made of polyester fibers which in turn are obtained from bottle flakes, postindustrial recycling and virgin polyester, and combinations thereof, and nonwoven fabrics are characterized by having a weight between 40 and 500 g/m$^2$.

3. The process in accordance with claim 1, wherein the woven fabric is manufactured with polyester filaments obtained from bottle flakes, recycled industrial post, virgin polyester and combinations thereof, and the fabric has a weight between 40 and 400 g/m$^2$.

4. The process in accordance with claim 1, wherein the nonwoven fabrics and the woven fabrics are used both for cutting (external part of footwear) and for lining (internal part of footwear), providing good permeability to footwear, and keeping the foot cool.

5. The process in accordance with claim 1, wherein the antibacterial insole is comprised in the ethylene templates, foamed vinyl acetate (EVA), natural latex with antibacterial additives.

6. The process in accordance with claim 1, wherein the adhesives are water based and are chosen from polyurethane, vinyl, acrylic based adhesives, or combinations thereof.

7. The process in accordance with claim 1, wherein the threads are made of recycled polyester from bottle flakes and industrial post, virgin polyester, polyamide (nylon), or mixtures thereof.

8. The process in accordance with claim 1, wherein the manufactured soles are comprised in those manufactured with thermoplastic rubber (TR), polyvinyl chloride (PVC), thermoplastic polyurethane (TPU), polyurethane, ranil, rubber, ethylene vinyl acetate (EVA), polystyrene, acrylonitrile-butadiene-styrene (ABS) and combinations thereof.

9. The process in accordance with claim 1, wherein the thermoplastic polymer is chosen from thermoplastic polymers of polyvinyl chloride (PVC), thermoplastic polyurethane (TPU), polyurethane, ranil, rubber, ethylene vinyl acetate (EVA), polystyrene, acrylonitrile-butadiene-styrene (ABS), rubber thermoplastic (TR), and combinations thereof.

10. The process in accordance with claim 1, wherein the inert loads are comprised of powdered polyester, calcium carbonate, talcum powder, wood dust, and silicates.

11. The process in accordance with claim 1, wherein the footwear is made of filaments made of recycled polyester of bottle flakes and industrial post, virgin polyester, cotton, acrylics, polypropylene and mixtures between them.

12. A footwear product obtained by the process in accordance with the process of claim 1.

13. A shoe product obtained by the process in accordance with claim 1, wherein the shoe product is manufactured with non-woven fabrics, woven, woven fabrics, laces, threads, and inert loads in a percentage between 5 and 90% of the recycled polyester (bottles).

\* \* \* \* \*